United States Patent
McBurney et al.

(10) Patent No.: US 10,197,142 B2
(45) Date of Patent: Feb. 5, 2019

(54) METHOD OF FORMING A TORQUE CONVERTER IMPELLER INCLUDING MACHINING A WELD ROOT

(71) Applicant: Schaeffler Technologies GmbH & Co. KG, Herzogenaurach (DE)

(72) Inventors: Craig McBurney, Wooster, OH (US); John Kachline, Wooster, OH (US); Miguel Angel Santana, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 774 days.

(21) Appl. No.: 14/539,653

(22) Filed: Nov. 12, 2014

(65) Prior Publication Data
US 2016/0131238 A1    May 12, 2016

(51) Int. Cl.
F16H 41/28    (2006.01)
F16H 45/02    (2006.01)
F16H 41/24    (2006.01)

(52) U.S. Cl.
CPC ............. F16H 41/28 (2013.01); F16H 45/02 (2013.01); *F16H 2045/0221* (2013.01)

(58) Field of Classification Search
CPC .......... F16H 41/28; F16H 41/24; F16H 45/02; F16H 2041/243; Y10T 29/4933; Y10T 29/49968; Y10T 29/4993
See application file for complete search history.

(56) References Cited

U.S. PATENT DOCUMENTS

| | | | | |
|---|---|---|---|---|
| 4,825,521 A | * | 5/1989 | Frotschner | F16H 41/28 228/162 |
| 5,384,958 A | * | 1/1995 | O'Daniel | B21D 53/80 29/557 |
| 6,023,843 A | * | 2/2000 | Mizobuchi | B23K 11/063 29/557 |
| 6,123,505 A | * | 9/2000 | Sasse | B29C 45/2628 249/57 |
| 6,406,262 B1 | * | 6/2002 | Kundermann | F16H 41/28 416/180 |
| 6,817,834 B2 | * | 11/2004 | Takabayashi | F16H 41/28 416/180 |
| 7,476,080 B2 | * | 1/2009 | Sato | F16H 41/28 228/175 |

(Continued)

OTHER PUBLICATIONS https://web.archive.org/web/20110510150106/http://www.tpub.com/steelworker1/18.htm Types of Welds Accessed Apr. 26, 2017, Published May 10, 2011*

*Primary Examiner* — Richard Edgar
*Assistant Examiner* — Alexander White
(74) *Attorney, Agent, or Firm* — Davidson, Davidson & Kappel, LLC

(57) ABSTRACT

A method of forming an impeller for a torque converter is provided. The method includes providing an impeller shell including a back axial surface for facing away from an interior of the torque converter, providing an impeller hub including an outer circumferential surface and forming a weld joining the impeller shell and the impeller hub. The weld is contiguous with the back axial surface of the impeller shell. The weld is also contiguous with the outer circumferential surface of the impeller hub. The weld includes a root where the impeller shell and the impeller hub meet the weld. The method also includes machining the root. An impeller for a torque converter is also provided.

14 Claims, 5 Drawing Sheets

(56) References Cited

U.S. PATENT DOCUMENTS

| | | | | |
|---|---|---|---|---|
| 7,997,072 B2* | 8/2011 | Peri | ........................ | F16H 41/24 |
| | | | | 60/330 |
| 2009/0314757 A1* | 12/2009 | Yelistratov | ........... | B23K 9/0203 |
| | | | | 219/137 R |
| 2012/0151907 A1* | 6/2012 | Jimenez | .................. | F16H 41/28 |
| | | | | 60/330 |
| 2015/0071789 A1* | 3/2015 | Resh | ....................... | F04D 29/18 |
| | | | | 416/234 |

* cited by examiner

METHOD OF FORMING A TORQUE CONVERTER IMPELLER INCLUDING MACHINING A WELD ROOT

The present disclosure relates generally to torque converters and more specifically to methods of forming impellers of torque converters.

BACKGROUND OF INVENTION

U.S. Pub. 2012/0151907 discloses method of connecting an impeller hub and impeller shell.

FIG. 1 shows a schematic cross-sectional side view of a torque converter 10 including an impeller 12 assembled in a manner similar to the impeller of U.S. Pub. 2012/0151907. Torque converter 10 includes a cover 14 including a front cover 16 and a rear cover 18, which is formed by an impeller shell 20 of impeller 12. Cover 14 houses a lockup clutch 22 and a damper 24, which are both schematically shown, and a turbine 26 opposite of impeller 12. Lockup clutch 22 engages with and disengages from front cover 16 and damper 24 couples turbine 26 to lockup clutch 22 such that turbine 26 is circumferentially driven with front cover 16 when lockup clutch 22 is engaged with front cover 16. Impeller 12 further includes an impeller hub 46 welded to impeller shell 20 and impeller blades 36 supported by a rounded portion 34 of impeller shell 20. An inner radial end of impeller shell 20 extends past the weld and abuts and axial surface of impeller hub 46.

BRIEF SUMMARY OF THE INVENTION

A method of forming an impeller for a torque converter is provided. The method includes providing an impeller shell including a back axial surface for facing away from an interior of the torque converter, providing an impeller hub including an outer circumferential surface and forming a weld joining the impeller shell and the impeller hub. The weld is contiguous with the back axial surface of the impeller shell. The weld is also contiguous with the outer circumferential surface of the impeller hub. The weld includes a root where the impeller shell and the impeller hub meet the weld. The method also includes machining the root.

An impeller for a torque converter is also provided. The impeller includes an impeller shell for supporting a plurality of impeller blades. The impeller shell includes a front axial surface for facing in the direction of the impeller blades. The impeller also includes an impeller hub including a front axial surface and a weld joining the impeller shell and the impeller hub. The weld includes a front axial surface. The front axial surface of the weld is contiguous with the front axial surface of the impeller shell and the front axial surface of the impeller hub.

BRIEF DESCRIPTION OF THE DRAWINGS

The present invention is described below by reference to the following drawings, in which:

FIG. 2a shows a cross-sectional side view of an impeller in accordance with an embodiment of the present invention;

FIG. 2b shows an enlarged cross-sectional side view of a radially inner portion of impeller shown in FIG. 2a;

DETAILED DESCRIPTION

The present disclosure provides methods of forming an impeller. The methods may include a machining that thins both an impeller shell and an impeller hub at a weld location to remove a weld root. The machining may advantageously remove a stress concentration point from which a crack is likely to propagate during the operation of the impeller. An impeller formed by the method may include an s-shape from the impeller shell to a flange of the impeller hub.

Figure 1:
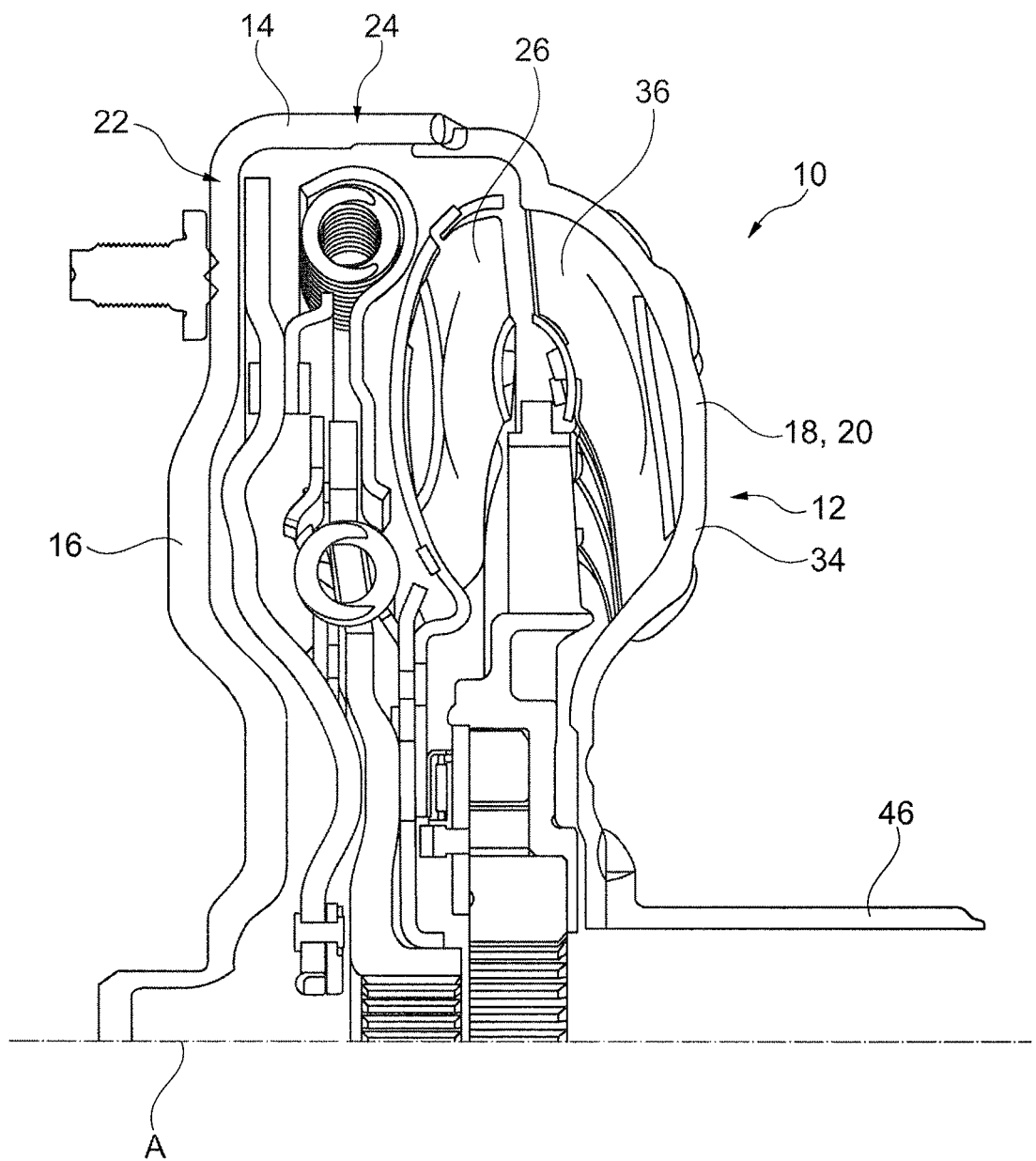
FIG. 1 shows a cross-sectional side view of a torque converter including a conventional impeller.
Figures 2A, 2B:
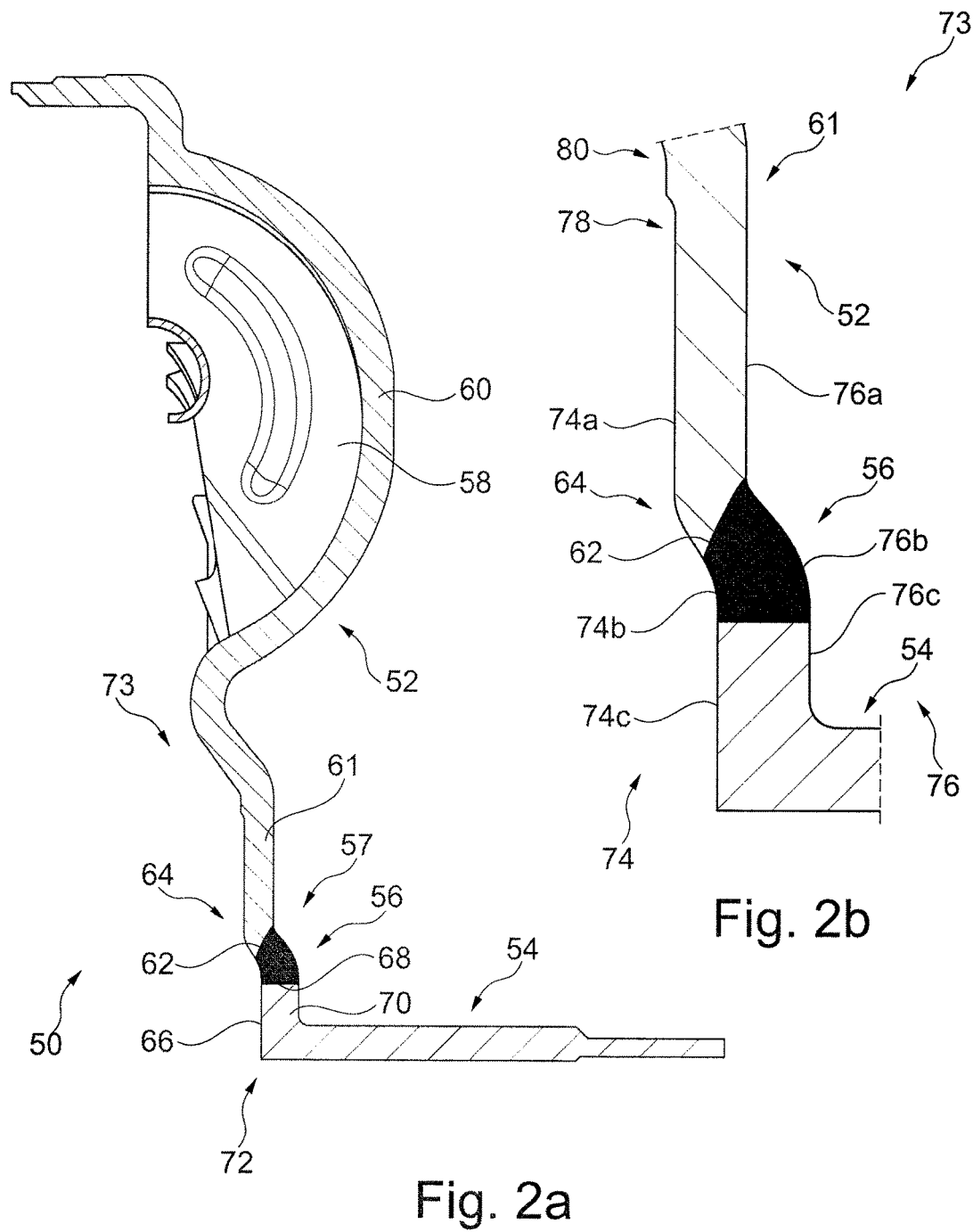

FIG. 2a shows a cross-sectional side view of an impeller 50 in accordance with an embodiment of the present invention. Impeller 50 includes an impeller shell 52, which forms a rear cover of a torque converter in accordance with an embodiment of the present invention, and an impeller hub 54 fixed to impeller shell 52 by a weld 56 defining a joint 57 of impeller hub 54 and impeller 52. Impeller 50 further includes impeller blades 58 supported by a rounded blade receiving portion 60 of impeller shell 52. Rounded blade receiving portion 60 is radially outside of an inner radial extension 61 that radially abuts and is joined to weld 56 to connect inner radial extension 61 to impeller hub 54 via weld 56. A radially inner edge 62 of impeller shell 52, more specifically of inner radial extension 61, radially abuts weld 56 such that radially inner end 64 of impeller shell 52 does not extend past weld 56 and does not abut an axial surface 66 of impeller hub 54 that is configured for facing an interior of the torque converter. Weld 56 radially abuts and is joined to an outer circumferential surface 68 of a flange 70 formed at an axial end 72 of impeller hub 54.

FIG. 2b shows an enlarged cross-sectional side view of impeller hub 54 and impeller shell 52 at a radially inner portion 73 of impeller 50. Impeller shell 52, impeller hub 54 and weld 56 together form a front axial surface 74 of impeller 50 for facing the interior of the torque converter and a back axial surface 76 for facing away from the interior of the torque converter. More specifically, inner radial extension 61 includes a front axial surface 74a for facing the interior of the torque converter and a back axial surface 76a for facing away from the interior of the torque converter, weld 56 includes a front axial surface 74b for facing the interior of the torque converter and a back axial surface 76b for facing away from the interior of the torque converter and impeller hub 54, at flange 70, includes a front axial surface 74c formed by surface 66 for facing the interior of the torque converter and a back axial surface 76c for facing away from the interior of the torque converter. Accordingly, front axial surface 74 is formed by front axial surface 74b of weld 56 contiguously joining front axial surface 74a of impeller shell 52 and front axial surface 74c of impeller hub 54, and back axial surface 76 is formed by back axial surface 76b of weld 56 contiguously joining back axial surface 76a of impeller shell 52 and back axial surface 76c of impeller hub 54. Front axial surfaces 74a, 74b, 74c are machined such that front axial surface 74a smoothly transitions to front axial surface 74b and front axial surface 74b smoothly transitions to front axial surface 74c. The machining of front axial surface 74 also provides front axial surface 74a of impeller shell 52 with a thinned section 78 at inner radial extension 61. Thinned section 78 is thinner than an unthinned section 80 directly radially outside of thinned section 78.

Front axial surface 74 is formed to have a substantial s-shape at inner radial portion 73. More specifically, front axial surface 74c of impeller hub 54 has a rectilinear shape, front axial surface 74b of weld 56 has a curved concave shape directly joined to the rectilinear shape of surface 74c, and front axial surface 74a, at radially inner end 64, includes a curved convex shape directly joined to the curved concave shape of surface 74b. Directly radially outside of the curved convex shape of front axial surface 74a, front axial surface 74a further has a rectilinear shape at thinned section 78.

Figure 3A:
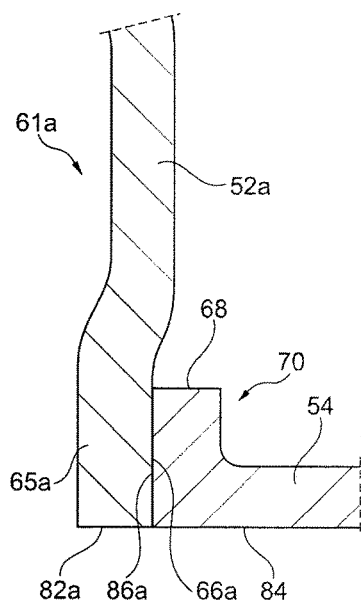
FIGS. 3a to 3c illustrate a method of forming an impeller in accordance with an embodiment of the present invention.
Figure 3B:
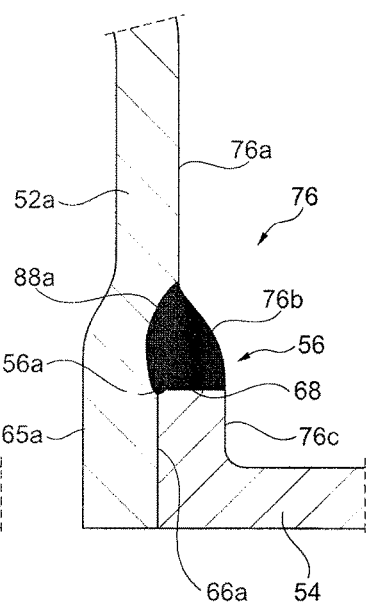
Figure 3C:
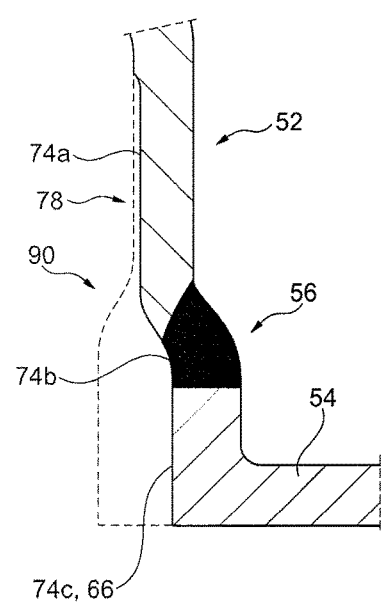

FIGS. 3a to 3c illustrate a method of forming impeller 50 in accordance with an embodiment of the present invention. In this embodiment, impeller shell 52a and impeller hub 54 are positioned with respect to each other such that a radially inner end of radial extension 61a of impeller shell 52a extends past outer circumferential surface 68 of flange 70 of impeller hub 54. Although this embodiment shows that a radially innermost surface 82a, i.e., the inner circumferential surface of impeller shell 52a, aligns with an inner circumferential surface 84 of hub 54, in other embodiments where radially inner end 65a extends past outer circumferential surface 68 of flange 70, radially innermost surface 82a may be radially outside of inner circumferential surface 84 of hub 54.

In FIG. 3a, impeller shell 52a and impeller hub 54 are positioned with respect to each other such that an axial surface 86a of radially inner end 65a of impeller shell 52a flushly contacts a starting front axial surface 66a of impeller hub 54.

As shown in FIG. 3b, after axial surface 86a of radially inner end 65a of impeller shell 52a flushly contacts axial surface 66a of impeller hub 54, weld 56 is formed to join impeller shell 52a and impeller hub 54. More specifically, weld 56 is formed contiguously with outer circumferential surface 68 of flange 70 of impeller hub 54 and with a back axial surface 88a of radial extension 61 that is radially outside of radially inner end 65a. After impeller shell 52a and impeller hub 54 are welded together by weld 56, back axial surface 76 of impeller 50 is formed by back axial surface 76b of weld 56 contiguously joining back axial surface 76a of impeller shell 52, which is radially outside of back axial surface 88a, and contiguously joining back axial surface 76c of impeller hub 54. Weld 56 includes a root 56a at an area adjacent to axial surfaces 86a, 66a. Root 56a is the area where the impeller shell 52a and impeller hub 54 meet weld 56.

As shown in FIG. 3c, after impeller shell 52a and impeller hub 54 are joined by weld 56, impeller shell 52a, impeller hub 54 and weld 56 are machined at an axial front side 90 to form impeller 50. FIG. 3c shows a dotted line outlining the portions of impeller shell 52a, weld 56 and impeller hub 54 removed by the machining. The purpose of the machining is to remove root 56a to advantageously remove a stress concentration point from which a crack is likely to propagate during the operation of impeller 50. To remove root 56a, the machining is performed to remove starting front axial surface 66a of impeller hub 54 to define machined axial surface 66, to remove radially inner end 65a of impeller shell 52a and to remove a front facing portion of weld 56, which includes root 56a. The machining of weld 56 forms the curved concave shape at axial front surface 74b. The machining of impeller shell 52a also forms the curved convex shape at front axial surface 74a of radially inner end 64 and the rectilinear shape at front axial surface 74a of thinned section 78. Radially inner end 65a is removed by the machining such that axial surface 66 forming front axial surface 74c is not at all covered by impeller shell 52a.

Figure 4A:
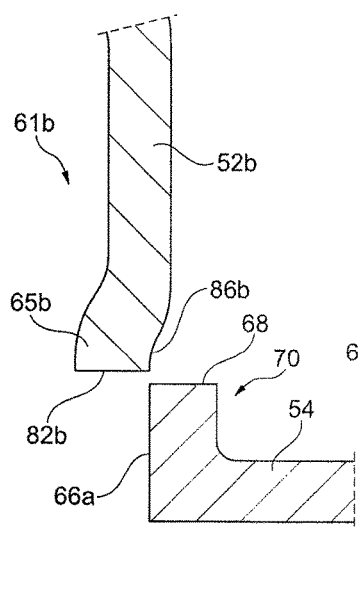
FIGS. 4a to 4c illustrate a method of forming an impeller in accordance with another embodiment of the present invention.
Figure 4B:
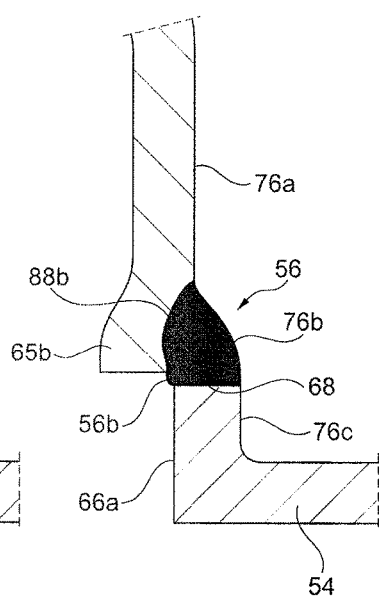
Figure 4C:
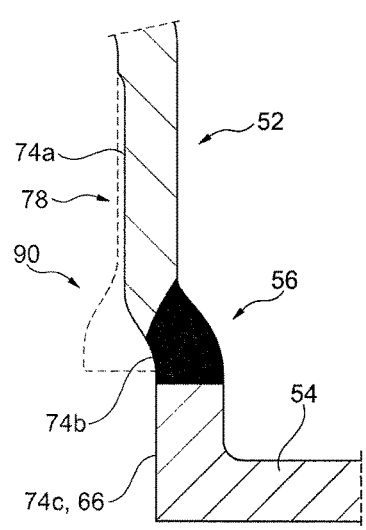

FIGS. 4a to 4c illustrate a method of forming impeller 50 in accordance with another embodiment of the present invention. In this embodiment, impeller shell 52b and impeller hub 54 are positioned with respect to each other such that radial extension 61b of impeller shell 52b includes a radially inner end 65b that does not extend past outer circumferential surface 68 of flange 70 of impeller hub 54. A radially innermost surface 82b, i.e., the inner circumferential surface of impeller shell 52b, is aligned radially outside of outer circumferential surface 68 of flange 70.

In FIG. 4a, impeller shell 52b and impeller hub 54 are positioned with respect to each other such that an axial surface 86b of radially inner end 65b of impeller shell 52b is substantially aligned with starting front axial surface 66a of impeller hub 54.

As shown in FIG. 4b, after axial surface 86b of radially inner end 65b of impeller shell 52b is substantially aligned with front axial surface 66a of impeller hub 54, weld 56 is formed to join impeller shell 52b and impeller hub 54. More specifically, weld 56 is formed contiguously with outer circumferential surface 68 of flange 70 of impeller hub 54 and with a back axial surface 88b of radial extension 61 that is adjacent to radially inner end 65b. After impeller shell 52b and impeller hub 54 are welded together by weld 56, back axial surface 76 of impeller 50 is formed by back axial surface 76b of weld 56 contiguously joining back axial surface 76a of impeller shell 52b, which is radially outside of back axial surface 88b, and contiguously joining back axial surface 76c of impeller hub 54. Weld 56 includes a root 56b at an area adjacent to axial surfaces 88b, 66a. Root 56b is the area where the impeller shell 52b and impeller hub 54 meet weld 56.

As shown in FIG. 4c, after impeller shell 52b and impeller hub 54 are joined by weld 56, impeller shell 52b, impeller hub 54 and weld 56 are machined at axial front side 90 to form impeller 50. FIG. 4c shows a dotted line outlining the portions of impeller shell 52b, weld 56 and impeller hub 54 removed by the machining. The purpose of the machining is to remove root 56b to advantageously remove a stress concentration point from which a crack is likely to propagate during the operation of impeller 50. To remove root 56b, the machining is performed to remove starting front axial surface 66a of impeller hub 54 to define machined axial surface 66, to remove radially inner end 65b of impeller shell 52b and to remove a front facing portion of weld 56, which include root 56b. The machining of weld 56 forms the curved concave shape at axial front surface 74b. The machining of impeller shell 52b also forms the curved convex shape at front axial surface 74a adjacent to weld 56 and the rectilinear shape at front axial surface 74a of thinned section 78.

Figure 5:
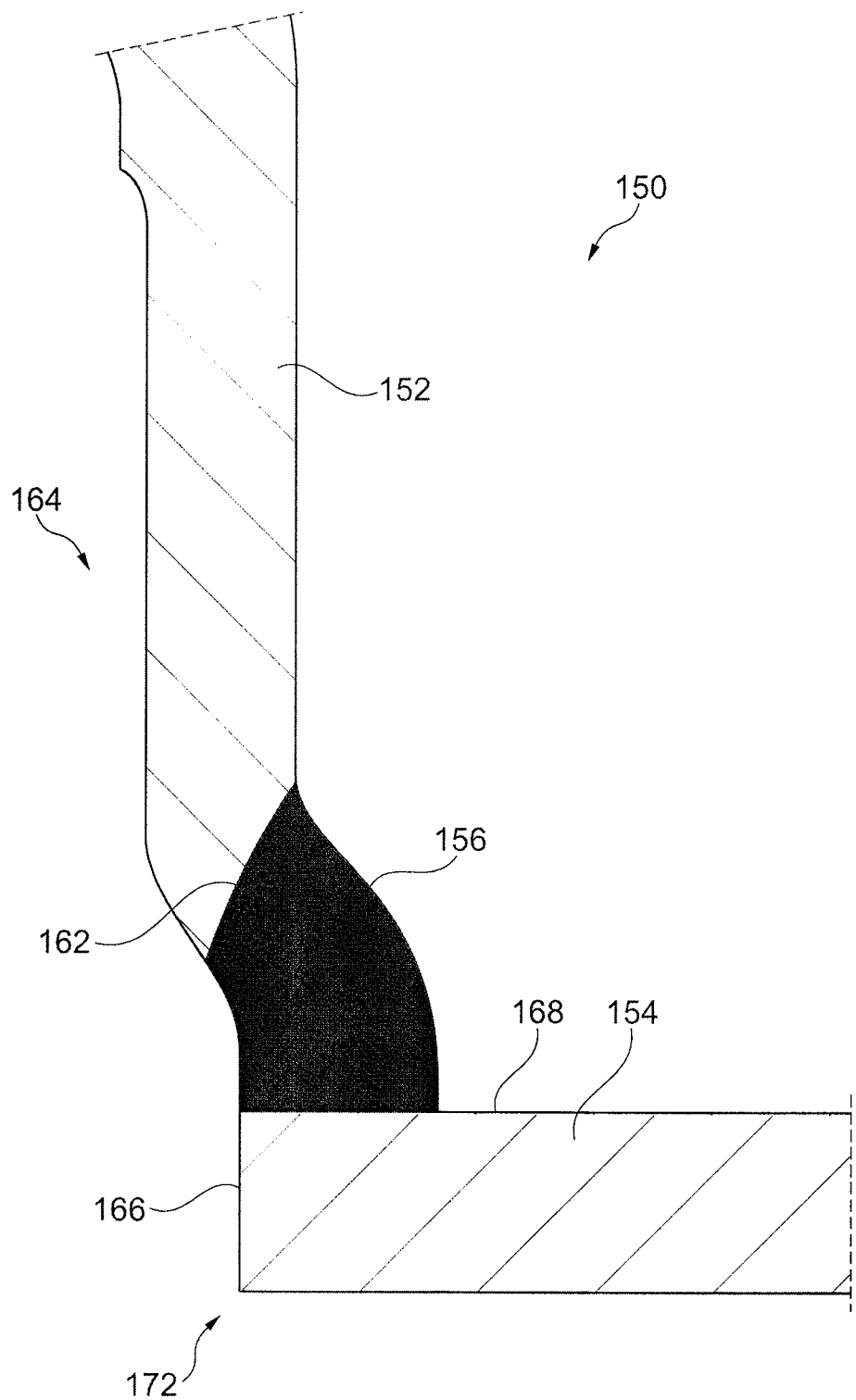
FIG. 5 shows a cross-sectional side view of an impeller in accordance with an embodiment of the present invention.

FIG. 5 shows an enlarged cross-sectional side view of an impeller hub 154 and an impeller shell 152 of an impeller 150 in accordance with another embodiment of the present invention. In this embodiment, in contrast to impeller hub 54 described above, impeller hub 154 is formed as a tube that does not include a flange. Otherwise, the joint formed between impeller shell 152 and impeller hub 154 by a weld 156 is the same as the joint formed between impeller shell 52 and impeller hub 54 by weld 56 as described above. Accordingly, radially inner edge 162 of impeller shell 152 radially abuts weld 156 such that radially inner end 164 of impeller shell 152 does not extend past weld 156 and does not abut an axial surface 166 of impeller hub 154 that is configured for facing an interior of the torque converter.

Weld 156 radially abuts and is joined to an outer circumferential surface 168 of hub 154 at an axial end 172 of impeller hub 154.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of forming an impeller for a torque converter comprising:
   providing an impeller shell including a back axial surface for facing away from an interior of the torque converter;
   providing an impeller hub including an outer circumferential surface;
   forming a weld joining the impeller shell and the impeller hub, the weld being contiguous with the back axial surface of the impeller shell, the weld being contiguous with the outer circumferential surface of the impeller hub, the weld including a root where the impeller shell and the impeller hub meet the weld; and
   machining the root,
   wherein the impeller shell and the impeller hub are arranged during the forming of the weld such that a front axial surface of the impeller shell is axially offset from a front axial surface of the impeller hub.

2. The method as recited in claim 1 wherein the machining of the root includes machining a radially inner end of the impeller shell.

3. The method as recited in claim 1 wherein the machining of the root includes machining the front axial surface of the impeller hub.

4. The method as recited in claim 1 wherein after the machining of the root, the impeller includes an axial front surface including a machined front axial surface of the impeller hub, a machined front axial surface of the weld and a machined front axial surface of the impeller shell.

5. The method as recited in claim 4 wherein the machined front axial surface of the weld is contiguous with the machined front axial surface of the impeller shell and the machined front axial surface of the impeller hub.

6. The method as recited in claim 5 wherein the machined front axial surface of the weld has a curved concave shape.

7. The method as recited in claim 5 wherein a portion of the machined front axial surface of the impeller shell has a curved convex shape.

8. An impeller for a torque converter comprising:
   an impeller shell for supporting a plurality of impeller blades, the impeller shell includes a front axial surface for facing in a direction of the impeller blades and a back axial surface facing away from the impeller blades, the impeller shell including a rounded blade receiving portion for supporting the plurality of impeller blades and an inner radial extension radially inside of the rounded blade receiving portion;
   an impeller hub including a front axial surface; and
   a weld joining the impeller shell and the impeller hub, the weld including a front axial surface and a back axial surface, the front axial surface of the weld being contiguous with the front axial surface of the impeller shell and the front axial surface of the impeller hub, the back axial surface of the weld being contiguous with the back axial surface of the impeller shell, an inner circumferential surface of the inner radial extension radially abutting and being joined to the weld, the weld radially abutting and being joined to an outer circumferential surface of a flange of the impeller hub formed at an axial end of the impeller hub, wherein the front axial surface of the impeller shell is axially offset from the front axial surface of the impeller hub.

9. The impeller as recited in claim 8 wherein the flange of the impeller hub has a back axial surface for facing away from the impeller blades, the back axial surface of the impeller shell, the back axial surface of the weld and the back axial surface of the flange defining a back axial surface of a radially inner portion of the impeller.

10. The impeller as recited in claim 9 wherein the back axial surface of the weld is contiguous with the back axial surface of the impeller shell and the back axial surface of the flange of the impeller hub.

11. The impeller as recited in claim 8 wherein the front axial surface of the weld has a curved concave shape.

12. The impeller as recited in claim 8 wherein the front axial surface of the impeller shell includes a portion having a curved convex shape.

13. A torque converter comprising the impeller as recited in claim 8.

14. An impeller for a torque converter comprising:
   an impeller shell for supporting a plurality of impeller blades, the impeller shell includes a front axial surface for facing in a direction of the impeller blades and a back axial surface;
   an impeller hub including a front axial surface; and
   a weld joining the impeller shell and the impeller hub, the weld including a front axial surface and a back axial surface, the front axial surface of the weld being contiguous with the front axial surface of the impeller shell and the front axial surface of the impeller hub, the back axial surface of the weld being contiguous with the back axial surface of the impeller shell, the front axial surface of the weld having a curved concave shape, wherein the front axial surface of the impeller shell is axially offset from the front axial surface of the impeller hub.

* * * * *